(12) United States Patent
Hahn et al.

(10) Patent No.: US 6,898,150 B2
(45) Date of Patent: May 24, 2005

(54) HYDRAULICALLY BALANCED RECIPROCATING PULSER VALVE FOR MUD PULSE TELEMETRY

(75) Inventors: Detlef Hahn, Hannover (DE); Volker Peters, Wienhausen (DE); Cedric Rouatbi, Celle (DE)

(73) Assignee: Baker Hughes Incorporated, Houston, TX (US)

( * ) Notice: Subject to any disclaimer, the term of this patent is extended or adjusted under 35 U.S.C. 154(b) by 639 days.

(21) Appl. No.: 10/096,451

(22) Filed: Mar. 12, 2002

(65) Prior Publication Data

US 2002/0159333 A1 Oct. 31, 2002

Related U.S. Application Data (60) Provisional application No. 60/275,342, filed on Mar. 13, 2001.

(51) Int. Cl.$^7$ .................................................. H04H 9/00
(52) U.S. Cl. ........................... 367/85; 137/269; 175/40; 367/83; 367/81
(58) Field of Search .............................. 367/85, 84, 83, 367/81; 175/40, 50; 181/102; 137/219

(56) References Cited

U.S. PATENT DOCUMENTS

| | | | |
|---|---|---|---|
| 2,759,143 A | 8/1956 | Arps ................................. 324/1 |
| 3,065,416 A | 11/1962 | Jeter ............................ 324/740 |
| 3,741,321 A | 6/1973 | Slover, Jr. et al. ............. 175/40 |
| 3,764,968 A | 10/1973 | Anderson et al. .............. 340/18 |
| 3,958,217 A | 5/1976 | Spinnler ....................... 340/18 |
| 4,215,427 A | 7/1980 | Waggener et al. ............. 367/83 |
| 4,266,606 A | 5/1981 | Stone ........................... 166/113 |
| 4,351,037 A | 9/1982 | Scherbatskoy ................ 367/85 |
| 4,519,574 A | 5/1985 | Roper ........................... 251/31 |
| 4,802,150 A | 1/1989 | Russell et al. ................. 367/85 |
| 4,901,290 A | 2/1990 | Feld ............................. 367/85 |
| 4,953,595 A | 9/1990 | Kotlyar .................. 137/624.13 |
| 5,055,837 A | 10/1991 | Abdallah et al. ............. 340/853 |
| 5,079,750 A | 1/1992 | Scherbatskoy ................ 367/85 |
| 5,103,430 A | * 4/1992 | Jeter et al. ..................... 367/85 |
| 5,115,415 A | * 5/1992 | Mumby et al. ................ 367/85 |
| 5,473,579 A | 12/1995 | Jeter ............................ 367/85 |
| 5,583,827 A | 12/1996 | Chin ............................ 367/84 |
| 5,586,084 A | 12/1996 | Barron et al. ................. 367/85 |
| 5,802,011 A | 9/1998 | Winters et al. ................ 367/83 |
| 5,836,353 A | * 11/1998 | Van Steenwyk ....... 137/624.15 |
| 6,002,643 A | 12/1999 | Tchakarov et al. ............ 367/85 |
| 6,097,310 A | 8/2000 | Harrell et al. .............. 340/854.3 |
| 6,469,637 B1 | * 10/2002 | Seyler et al. ............. 340/856.3 |
| 6,626,253 B2 | * 9/2003 | Hahn et al. .................... 175/48 |

FOREIGN PATENT DOCUMENTS

EP            0617196       6/2000

\* cited by examiner

*Primary Examiner*—Albert K. Wong
(74) *Attorney, Agent, or Firm*—Madan, Mossman & Sriram, P.C.

(57) ABSTRACT

A reciprocating pulser system for generating pressure fluctuations in a flowing drilling fluid comprising a reciprocating poppet and a stationary valve assembly with axial flow passages. The poppet reciprocates in close proximity to the valve assembly, at least partially blocking the flow through the valve assembly and generating oscillating pressure pulses. The poppet passes through two zero speed positions during each cycle, enabling rapid changes in signal phase, frequency, and/or amplitude thereby facilitating enhanced data encoding. The poppet is driven by a linear electric motor disposed in a lubricant filled housing. In one embodiment, the housing to shaft seal is a flexible bellows. In one embodiment, a force balance spring is used to essentially offset the hydraulic flow forces on the poppet. In one embodiment, a bypass poppet is used to adjust the differential pressure across the valve assembly.

13 Claims, 5 Drawing Sheets

HYDRAULICALLY BALANCED RECIPROCATING PULSER VALVE FOR MUD PULSE TELEMETRY

This application claims the benefit of U.S. Provisional Application No. 60/275,342 filed on Mar. 13, 2001.

BACKGROUND OF THE INVENTION

1. Field of the Invention

The present invention relates to drilling fluid telemetry systems and, more particularly, to a telemetry system incorporating a reciprocating pulser system for modulating the pressure of a drilling fluid circulating in a drill string within a well bore.

2. Description of the Related Art

Drilling fluid telemetry systems, generally referred to as mud pulse systems, are particularly adapted for telemetry of information from the bottom of a borehole to the surface of the earth during oil well drilling operations. The information telemetered often includes, but is not limited to, parameters of pressure, temperature, direction and deviation of the well bore. Other parameters include logging data such as resistivity of the various layers, sonic density, porosity, induction, self potential and pressure gradients. This information is critical to efficiency in the drilling operation.

The oil drilling industry needs to effectively increase mud pulse data transmission rates to accomodate the ever increasing amount of measured downhole data. The major disadvantage of available mud pulse valves is the low data transmission rate. Increasing the data rate with available valve types leads to unacceptably large power consumption, unacceptable pulse distortion, or may be physically impractical due to erosion, washing, and abrasive wear. Because of their low activation speed, nearly all existing mud pulse valves are only capable of generating discrete pulses. To effectively use carrier waves to send frequency shift (FSK) or phase shift (PSK) coded signals to the surface, the actuation speed must be increased and actuation fully controlled.

Mud pulse valves, also called pulsers, must operate under extremely high static downhole pressures, high temperatures, high flow rates and various erosive flow types. At these conditions, the valve must be able to create pressure pulses of around 100–300 psi.

Different types of valve systems are used to generate downhole pressure pulses. Valves that open and close a bypass from the inside of the drill string to the wellbore annulus create negative pressure pulses, for example see U.S. Pat. No. 4,953,595. Valves that use a controlled restriction placed in the circulating mud stream are commonly referred to as positive pulse systems, for example see U.S. Pat. No. 3,958,217.

Another example of a negative pulsing valve is illustrated in U.S. Pat. No. 4,351,037. This technology includes a downhole valve for venting a portion of the circulating fluid from the interior of the drill string to the annular space between the pipe string and the borehole wall. Drilling fluids are circulated down the inside of the drill string, out through the drill bit and up the annular space to surface. By momentarily venting a portion of the fluid flow out a lateral port, an instantaneous pressure drop is produced and is detectable at the surface to provide an indication of the downhole venting. A downhole instrument is arranged to generate a signal or mechanical action upon the occurrence of a downhole detected event to produce the above described venting. The downhole valve disclosed is defined in part by a valve seat, or nozzle, having an inlet and outlet and a valve stem movable to and away from the inlet end of the valve seat in a linear path with the drill string.

All negative pulsing valves need a certain high differential pressure below the valve to create sufficient pressure drop when the valve is open. Because of this high differential pressure, negative pulse valves are more prone to washing. In general, it is not desirable to bypass flow above the bit into the annulus. Therefore it must be ensured that the valve is able to completely close the bypass. With each actuation, the valve hits against the valve seat. Because of this impact, negative pulsing valves are more prone to mechanical and abrasive wear than positive pulsing valves.

Positive pulsing valves might, but do not need to, fully close the flow path for operation. Positive poppet type valves are less prone to wear out the valve seat. The main forces acting on positive poppet valves are hydraulic forces, because the valves open or close axially against the flow stream. To reduce the actuation power some poppet valves are hydraulically powered as shown in U.S. Pat. No. 3,958,217. Hereby the main valve is indirectly operated by a pilot valve. The low power consumption pilot valve closes a flow restriction, which activates the main valve to create the pressure drop. The power consumption of this kind of valve is very small. The disadvantage of this valve is the passive operated main valve. With high actuation rates the passive main valve is not able to follow the actively operated pilot valve. The pulse signal generated is highly distorted and hardly detectable at the surface.

Rotating disc valves open and close flow channels perpendicular to the flow stream. Hydraulic forces acting against the valve are smaller than for poppet type valves. With increasing actuation speed, dynamic forces of inertia are the main power consuming forces. U.S. Pat. No. 3,764,968 describes a rotating valve for the purpose to transmit frequency shift key (FSK) or phase shift key (PSK) coded signals. The valve uses a rotating disc and a non-rotating stator with a number of corresponding slots. The rotor is continuously driven by an electrical motor. Depending on the motor speed, a certain frequency of pressure pulses are created in the flow as the rotor intermittently interrupts the fluid flow. Motor speed changes are required to change the pressure pulse frequency to allow FSK or PSK type signals. There are several pulses per rotor revolution, corresponding to the number of slots in the rotor and stator. To change the phase or frequency requires the rotor to increase or decrease in speed. This may take a rotor revolution to overcome the rotational inertia and to achieve the new phase or frequency, thereby requiring several pulse cycles to make the transition. Amplitude coding of the signal is inherently not possible with this kind of continuously rotating device. In order to change the frequency or phase, large moments of inertia, associated with the motor, must be overcome, requiring a substantial amount of power. When continuously rotated at a certain speed, a turbine might be used or a gear might be included to reduce power consumption of the system. On the other hand, both options dramatically increase the inertia and power consumption of the system when changing form one to another speed for signal coding.

The aforesaid examples illustrate some of the critical considerations that exist in the application of a fast acting valve for generating a pressure pulse. Other considerations in the use of these systems for borehole operations involve the extreme impact forces, dynamic (vibrational) energies, existing in a moving drill string. The result is excessive wear, fatigue, and failure in operating parts of the system.

The particular difficulties encountered in a drill string environment, including the requirement for a long lasting system to prevent premature malfunction and replacement of parts, require a robust and reliable valve system.

The methods and apparatus of the present invention overcome the foregoing disadvantages of the prior art by providing a novel mud pulse telemetry system utilizing a reciprocating poppet type valve.

SUMMARY OF THE INVENTION

The present invention contemplates a mud pulse telemetry system utilizing a reciprocating pulser valve system for generating pressure pulses in the drilling fluid circulating in a drill string in a well bore.

One aspect of the invention includes a tool housing adapted to be inserted in the drill string near the bit. Mounted in the tool housing is a pulser assembly and an electronics module. The pulser assembly includes a nozzle assembly, an axially reciprocating poppet, and a linear actuator assembly for driving the poppet. The nozzle assembly includes a main nozzle and at least one bypass nozzle for channeling the drilling fluid flow through the nozzle assembly. The linear actuator assembly comprises a linear motor mounted in a lubricant filled housing. The linear motor drives a poppet in an axially reciprocating motion toward and then away from the main nozzle generating a pressure fluctuation in the flowing drilling fluid. A force balance spring is disposed between the motor and a housing end cap. The spring is designed to balance the hydraulic forces on the poppet. A bypass poppet is mounted downstream of the bypass nozzle and interacts with the bypass nozzle adjust the flow through the bypass nozzle to adjust the hydraulic forces on the poppet. A seal prevents wellbore fluid from entering the lubricant filled housing. The motor is powered and controlled by an electronics module.

In one embodiment, the electronics module senses pressure readings from pressure sensors mounted in the tool housing at locations above and below the pulser assembly. The processor in the electronics module acts to control the differential pressure across the valve, as indicated by the sensors, according to programmed instructions.

In another embodiment, the electronics module uses the tool housing mounted pressure sensors to receive surface generated pressure command signals, and to modify the downhole encoding based on the surface generated commands.

In one embodiment, a method is described for generating a fast transition in a mud pulse telemetry scheme utilizing phase shift key encoding (PSK), comprising, using a reciprocating pulser to generate pressure pulses; driving a reciprocating poppet at a first predetermined phase relationship, and changing the drive signal, at a predetermined poppet position, to a second predetermined phase relationship, and attaining the second predetermined phase relationship in no more than one oscillatory period.

In another embodiment, a method is described for generating a fast transition in a mud pulse telemetry scheme utilizing frequency shift key encoding (FSK), comprising, using a reciprocating pulser to generate pressure pulses; driving a reciprocating poppet at a first predetermined frequency, and changing the drive signal, at a predetermined poppet position, to a second predetermined frequency, and attaining the second predetermined frequency in no more than one oscillatory period.

In one embodiment, a method is described for generating a fast transition in a mud pulse telemetry scheme utilizing amplitude shift key encoding (ASK), comprising, using an reciprocating pulser to generate pressure pulses, driving a reciprocating poppet to a first predetermined travel distance to generate a first signal amplitude, and changing the drive signal, at a predetermined poppet position, to drive the poppet to a second predetermined travel distance to generate a higher or lower pulse amplitude than the first signal amplitude.

In another embodiment, a method is described for increasing the data transmission rate of a mud pulse telemetry system by using a combination of FSK and ASK signals to transmit data, comprising, using an reciprocating pulser to generate pressure pulses; driving a reciprocating poppet at a first predetermined frequency and first predetermined travel distance, and changing the drive signal, at a predetermined poppet position, to simultaneously change to a second predetermined frequency at a second predetermined travel distance, and attaining the second predetermined frequency and second predetermined travel distance in no more than one oscillatory period.

In another embodiment, a method is described for increasing the data transmission rate of a mud pulse telemetry system by using a combination of PSK and ASK signals to transmit data, comprising, using an reciprocating pulser to generate pressure pulses; driving a reciprocating poppet at a constant frequency at a first predetermined phase angle and first predetermined travel distance, and changing the drive signal, at a predetermined poppet position, to simultaneously change to a second predetermined phase angle at a second predetermined travel distance, and attaining the second predetermined phase angle and second predetermined travel distance in no more than one oscillatory period.

Examples of the more important features of the invention thus have been summarized rather broadly in order that the detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals, wherein.

DESCRIPTION OF PREFERRED EMBODIMENTS

Figure 1:
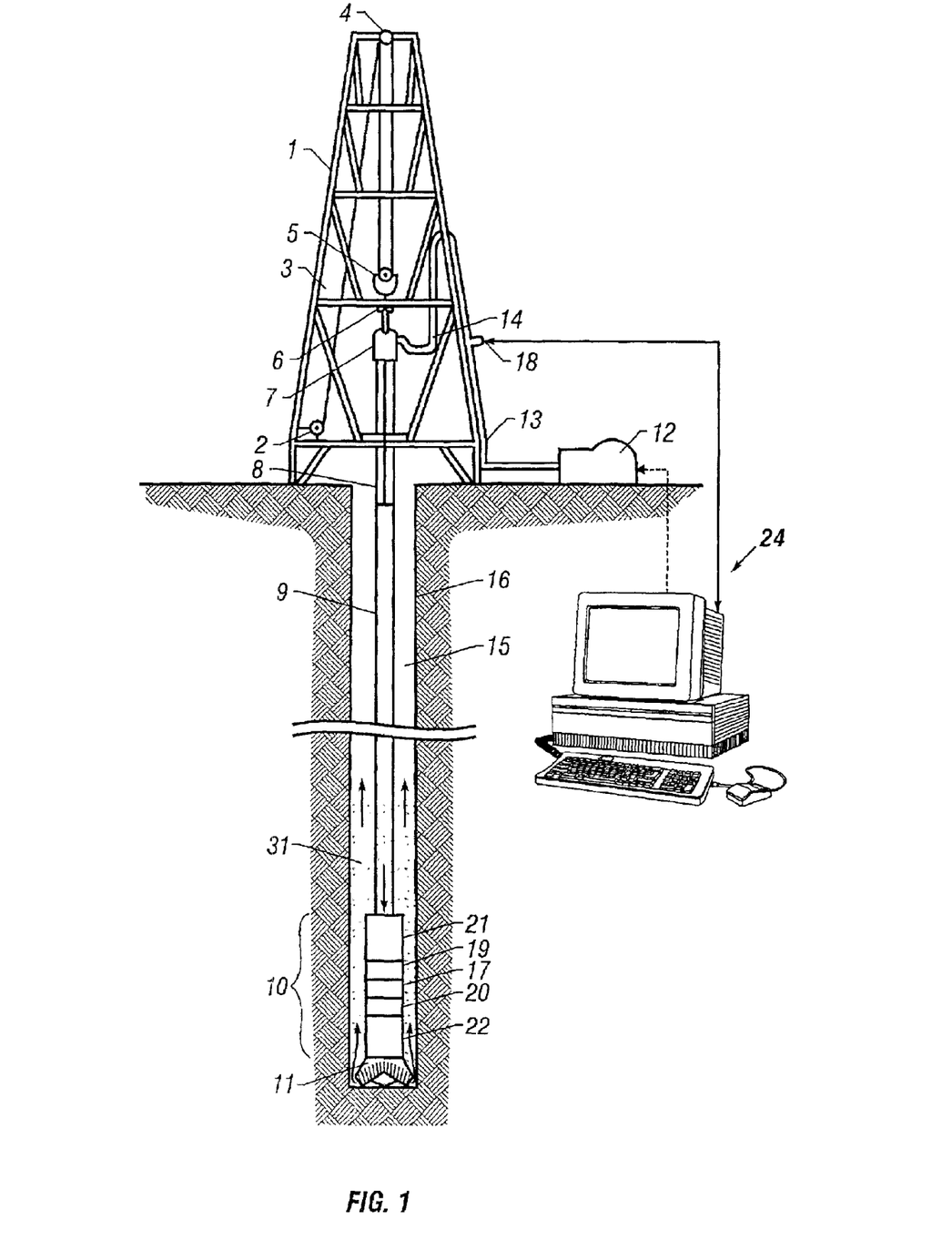
FIG. 1 is a schematic diagram showing a drilling rig 1 engaged in drilling operations.

FIG. 1 is a schematic diagram showing a drilling rig 1 engaged in drilling operations. Drilling fluid 31, also called drilling mud, is circulated by pump 12 through the drill string 9 down through the bottom hole assembly (BHA) 10, through the drill bit 11 and back to the surface through the annulus 15 between the drill string 9 and the borehole wall 16. The BHA 10 may comprise any of a number of sensor modules 17,20,22 which may include formation evaluation sensors and directional sensors. These sensors are well known in the art and are not described further. The BHA 10 also contains a pulser system 19 which induces pressure fluctuations in the mud flow. The pressure fluctuations, or pulses, propagate to the surface through the mud flow in the drill string 9 and are detected at the surface by a sensor 18 and a control unit 24. The sensor 18 is connected to the flow line 13 and may be a pressure transducer, a flow transducer, or a combination of a pressure transducer and a flow transducer.

Figure 2:
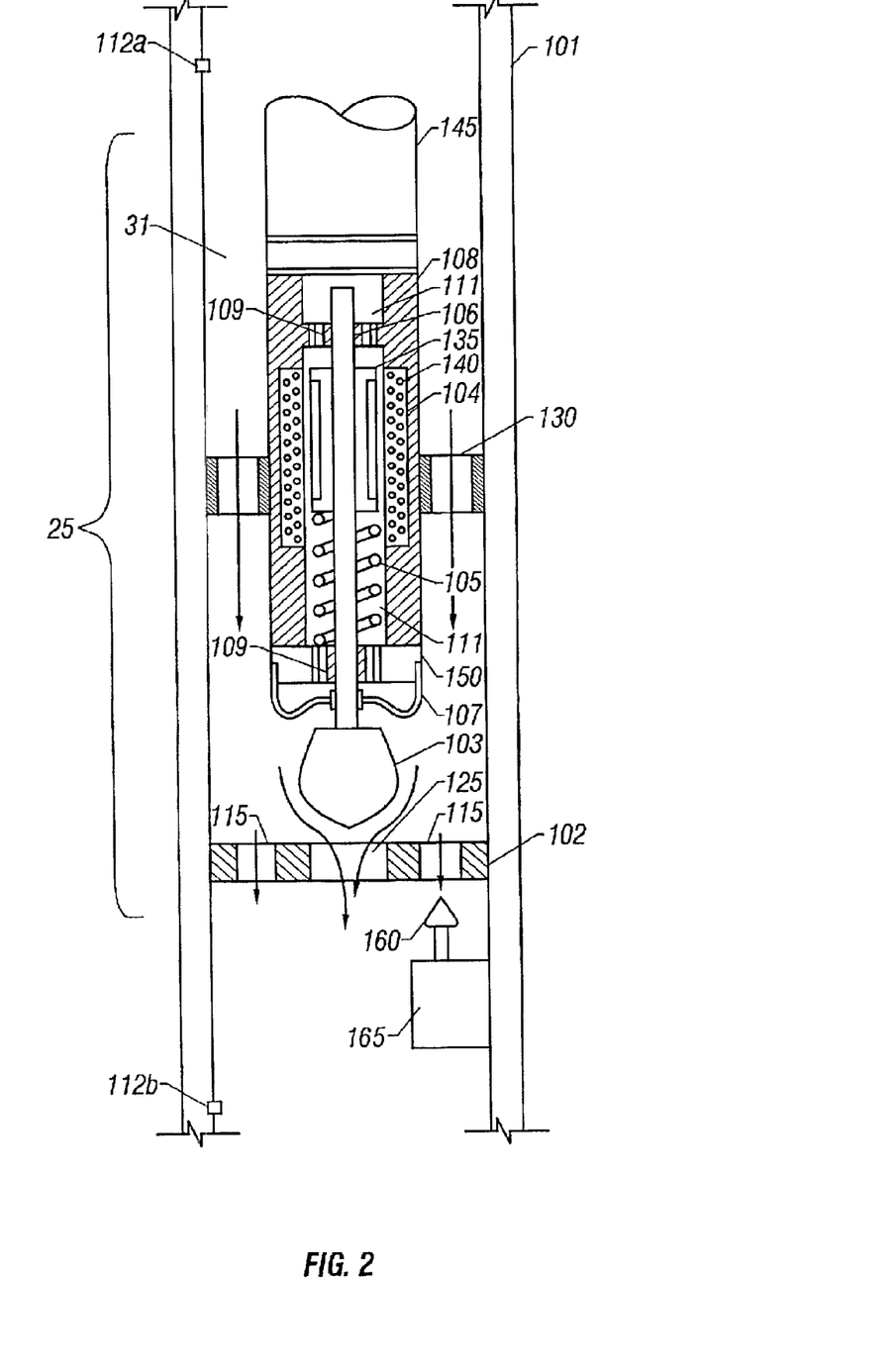
FIG. 2 is a schematic of a reciprocating pulser system according to one embodiment of the present invention.

FIG. 2 is a schematic view of a reciprocating pulser system for mud pulse telemetry. The reciprocating pulser assembly 25, also called a reciprocating pulser valve or reciprocating valve, is located in the inner bore of the tool housing 101. The housing 101 may be a bored drill collar adapted to fit into the BHA 10, or, alternatively, a separate housing adapted to fit into a drill collar bore. The nozzle assembly 102 is disposed in the flow path and is adapted to be attached to the tool housing 101 at a fixed location so as to constrain the drilling fluid 31 to flow through holes, also called nozzles or orifices, in the nozzle assembly 102. The nozzle assembly 102 has a centrally located main nozzle 125 and several bypass nozzles 115 equally spaced at a radial distance from the center of the main nozzle 125. In one preferred embodiment, the main nozzle 125 and the bypass nozzles 115 are holes bored through the body of the nozzle assembly 102. In another preferred embodiment, the holes in the nozzle assembly are adapted to accept erosion resistant sleeves (not shown). The sleeves may be of a relatively hard material, such as tungsten or tungsten carbide, or alternately, steel sleeves may be coated with a hard material, such as tungsten carbide. Such materials and coatings are commercially available and will not be discussed further. The sleeve flow passage may be straight or tapered.

The poppet 103 is attached to the shaft 106 and is axially driven by the linear motor 104 in a reciprocating motion. The poppet 103 is positioned such that at one end of the reciprocating motion, also called travel or stroke, the poppet 103 is in close proximity to the main nozzle 125 opening, thereby restricting the flow through the main nozzle 125 and generating an increase in the upstream pressure. The poppet 103 is then driven away from the main nozzle 125 to the other end of the reciprocating motion which results in a decrease in the upstream pressure. The reciprocating motion thereby generates pressure fluctuations, or pulses, in the drilling fluid 31. The motor 104 is contained in and attached to the bearing housing 108. The shaft 106 is attached to the motor 104 and supported by oil-lubricated bearings 109 at each end of the bearing housing 108. The bearings 109 may be linear sleeve type bearings or, alternatively, linear ball bushings. The bearing housing 108 is attached to the support ring 130 and the support ring is, in turn, attached to the tool housing 101. The support ring 130 has a number of holes or slots to allow the drilling fluid 31 to pass through. Linear motor 104 comprises a magnet carrier 135 attached to the shaft 106 with a coil 140 of electrical wire mounted on the inner diameter of the bearing housing 108 and surrounding the magnet carrier 135. The magnet carrier 135 and the coil 140 are sized so that the magnet carrier is able to freely move within the coil 140 and there is no physical interference between them. An electronics module 145 provides electrical signals to the coil 140 to accurately drive the magnet carrier-shaft-poppet combination in a linearly oscillating motion. Henceforth in this discussion, motion of the poppet is taken to mean motion of the magnet carrier 135-shaft 106-poppet 103 combination. Linear electric motors are commercially available and will not be discussed further. The electronics module 145 contains a processor and suitable circuitry, acting according to programmed instructions, which provide control signals to the linear motor. A linear motion measuring sensor (not shown) is located inside the linear motor 104 and provides position measurement to the electronics module 145 to facilitate feedback control of the motion of the poppet 103.

The entire pulser housing 108 is filled with appropriate lubricant 111 to lubricate the bearings 109 and to pressure compensate the internal pulser housing 108 pressure with the downhole pressure of the drilling mud 31. The seal 107 is a flexible bellows seal directly coupled to the shaft 106 and the pulser end cap 150 and hermetically seals the oil filled pulser housing 108. The linear movement of the shaft 106 causes the flexible material of the bellows seal 107 to deform thereby accommodating the linear motion. The flexible bellows material may be an elastomeric material or, alternatively, a fiber reinforced elastomeric material. It is necessary to keep the linear travel relatively small so that the bellows material will not be overstressed by the motion.

Figure 3:
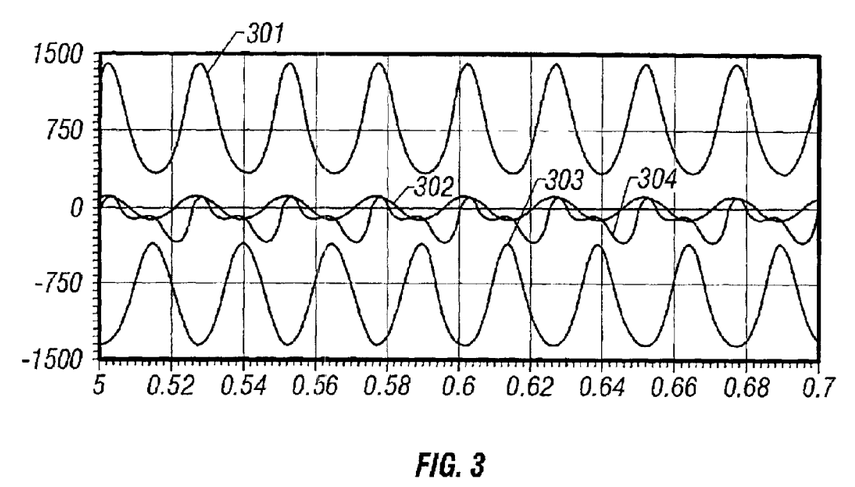
FIG. 3 is a graph of the forces acting on a reciprocating poppet according to one embodiment of the present invention.

In contrast to a rotating pulser valve, the hydraulic forces acting on an axially reciprocating pulser valve are more dependent on the pressure drop across the pulser valve. The pressure drop across the pulser valve is directly proportional to the fluid properties, typically density and viscosity, the fluid flow rate, and inversely proportional to the flow area through the nozzles, main 125 and bypass 115. To compensate these hydraulic forces, a force balancing spring 105 is disposed between the end cap 150 and the magnet carrier 135. The spring force is used to offset the hydraulic forces at a nominal operating flow rate. For example, FIG. 3 shows the typical forces acting on the reciprocating valve at a reciprocating frequency of 40 Hz and a nominal flow rate of 2000 liters per minute. The main forces acting on the poppet are the hydraulic forces 301, primarily due to the pressure drop created; the dynamic force 302 caused by the acceleration of the masses; and the counterbalancing spring force 303. By adding these forces, the spring force 303 compensates most of the hydraulic forces 301 such that the total pulser force 304 is approximately equal to the dynamic force 302 which requires less force, and hence less power, than a reciprocating valve without a compensating spring.

Downhole tools, including pulser valves, must operate over a range of flow rates and fluid properties. For example, with a constant flow area, as the flow rate and/or fluid viscosity or fluid density are increased, the pressure drop will increase, and hence the hydraulic forces acting on the poppet will increase thereby changing the desired balance of forces on the poppet 103. In order to provide for these operational changes, at least one of the bypass nozzles 115 has a bypass poppet 160, see FIG. 2, mounted downstream of the nozzle assembly 102 and located so that the bypass poppet 160 can be driven by actuator 165 toward or away from the bypass nozzle 115, to reduce or enlarge the effective flow area of the nozzle assembly 102, thereby controlling the nominal pressure drop across the nozzle assembly 102. By controlling the pressure drop across the nozzle assembly 102, the hydraulic forces on the main poppet 125 can be maintained at an essentially constant value. The bypass poppet actuator 165 can be a linear motor or a conventional motor driven ball-screw actuator. These actuators are commercially available and are not discussed further.

Referring to FIG. 2, pressure sensors 112a and 112b are mounted upstream and downstream of the nozzle assembly 102, respectively, such that they can measure the fluid pressure in the fluid flowing inside the tool housing 101. The pressure sensors 112a,b are powered and controlled by electronics module 145. In one preferred embodiment, a processor in the electronics module 145, according to programmed instructions, uses the pressure signals from pressure sensors 112a,b to generate a differential pressure value across the nozzle assembly 102. The processor, according to programmed instruction, modifies the position of the bypass poppet 160, with respect to the bypass nozzle 115, so as to maintain a predetermined differential pressure across the nozzle assembly 102. In another preferred embodiment, the pressure sensors 112a,b sense pressure command signals transmitted from a surface location. The processor then, according to programmed instructions, modifies the signal encoding scheme to provide improved data transmission to the surface.

The electronics module 145 may contain a programmable processor which can be programmed to transmit data utilizing any of a number of encoding schemes which include, but are not limited to, Amplitude Shift Keying (ASK), Frequency Shift Keying (FSK), or Phase Shift Keying (PSK) or the combination of these techniques. The processor in the electronics module 145 may be programmed to alter the data encoding parameters based on surface transmitted pulses. The encoding parameters can include type of encoding scheme, baseline pulse amplitude, baseline frequency, or other parameters affecting the encoding of data.

The above described linear motor drive system provides precise control of the axial position of the poppet 103 with respect to the position of the main nozzle 125. Such precise control allows the improved use of several encoding schemes common to the art of mud pulse telemetry.

With the reciprocating spring balanced pulser system, the encoding or switching between phase, frequency, or amplitude does not require high actuation power, because the hydraulic forces are always balanced in any poppet position. Starting from the zero speed level a phase, frequency, or amplitude change does not substantially affect the overall power consumption, because the dynamic forces are zero at zero speed. In a preferred embodiment, the main power is used to drive the system at a high frequency level. Once it is capable of creating a high frequency it can switch to another one almost immediately. This quick change gives a very high degree of freedom for encoding of telemetry data. The characteristic used for the encoding (frequency, phase or amplitude change) can be switched from one state to a second state, thereby transmitting information, within one period or less. No transition zone is needed between the different levels of encoded information. Hence there will be more information content per time frame in the pressure pulse signal of the reciprocating spring balanced pulser than with a conventional pulser.

Figure 4:
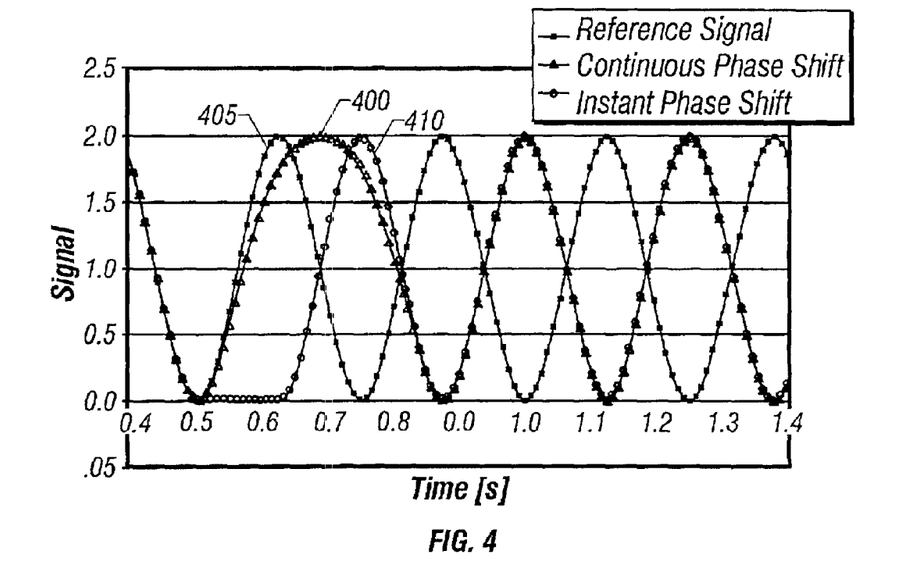
FIG. 4 is schematic which describes Phase Shift Key encoding using a reciprocating valve according to one embodiment of the present invention.

FIG. 4 displays a graph which shows Phase Shift Key encoding of the reciprocating valve as compared to a continuously rotating shear valve. The continuous phase shift signal 400 requires 1½ signal periods of the reference signal 405 to achieve a full 180° phase shift. In the transition time between 0.5 s and 0.9 s the information of the continuous phase shift signal 400 can not be used because it contains multiple frequencies. With the reciprocating valve, the linear motor allows the poppet to be phase shifted at essentially any time thereby effectively providing an essentially instant phase shift. As shown in FIG. 4, the reciprocating valve phase shift signal 410 starts at 0.5 s already in the proper phase shifted relationship with the reference signal 400 such that the following signal period can already be used for encoding purposes. Thus, there is more information per time frame with a phase shift keying signal generated with an reciprocating valve than with a continuously rotating shear valve.

Figure 5:
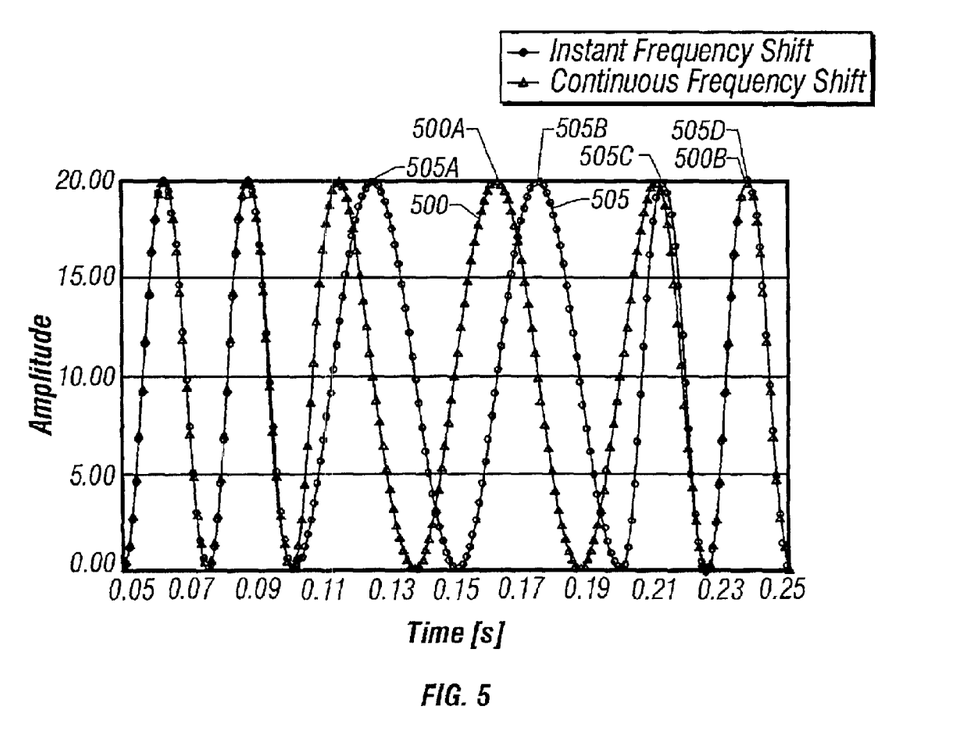
FIG. 5 is a schematic which describes Frequency Shift Key encoding using a reciprocating valve according to one embodiment of the present invention.

FIG. 5 displays a graph showing a Frequency Shift Keying signal of the reciprocating valve compared to a signal of a continuously rotating shear valves using the same encoding scheme. This example shows a frequency shift from 40 Hz to 20 Hz and back to 40 Hz. At 0.10 s the frequency is shifted from 40 Hz to 20 Hz, with the signal 500 from the continuously rotating shear valve, shifting only one full amplitude 500a of the low frequency at 0.16 s before it must shift back to the high frequency signal at 500b. Only the peaks at 500a and 500b are suitable for encoding information. The transition periods before and after the frequency shift contain multiple frequencies which can not be used for coding purposes. With the signal 505 from the reciprocating valve, there are still two fully usable amplitudes 505a and 505b at the lower frequency and two usable peaks at the higher frequency 505c and 505d. As with phase shift keying, there is more information content per time frame with the reciprocating valve than with a continuously rotating shear valve. This can provide higher detection reliability by providing more cycles to lock onto, or alternatively the frequency changes can be more rapid, thereby increasing the data rate, or a combination of these.

An Amplitude Shift Key (ASK) signal can be easily generated with the reciprocating valve of the present invention. The signal amplitude is proportional to the amount of flow restriction and thus is proportional to the amount of linear motion, or travel, of the poppet 103 bringing it in proximity to the main nozzle 125. The poppet position can be continuously controlled and, therefore, the amplitude of each cycle can be different as the motor 104 can accurately move the poppet 103 through a different travel on each cycle according to programmed control from the electronics module 145.

Figure 6:
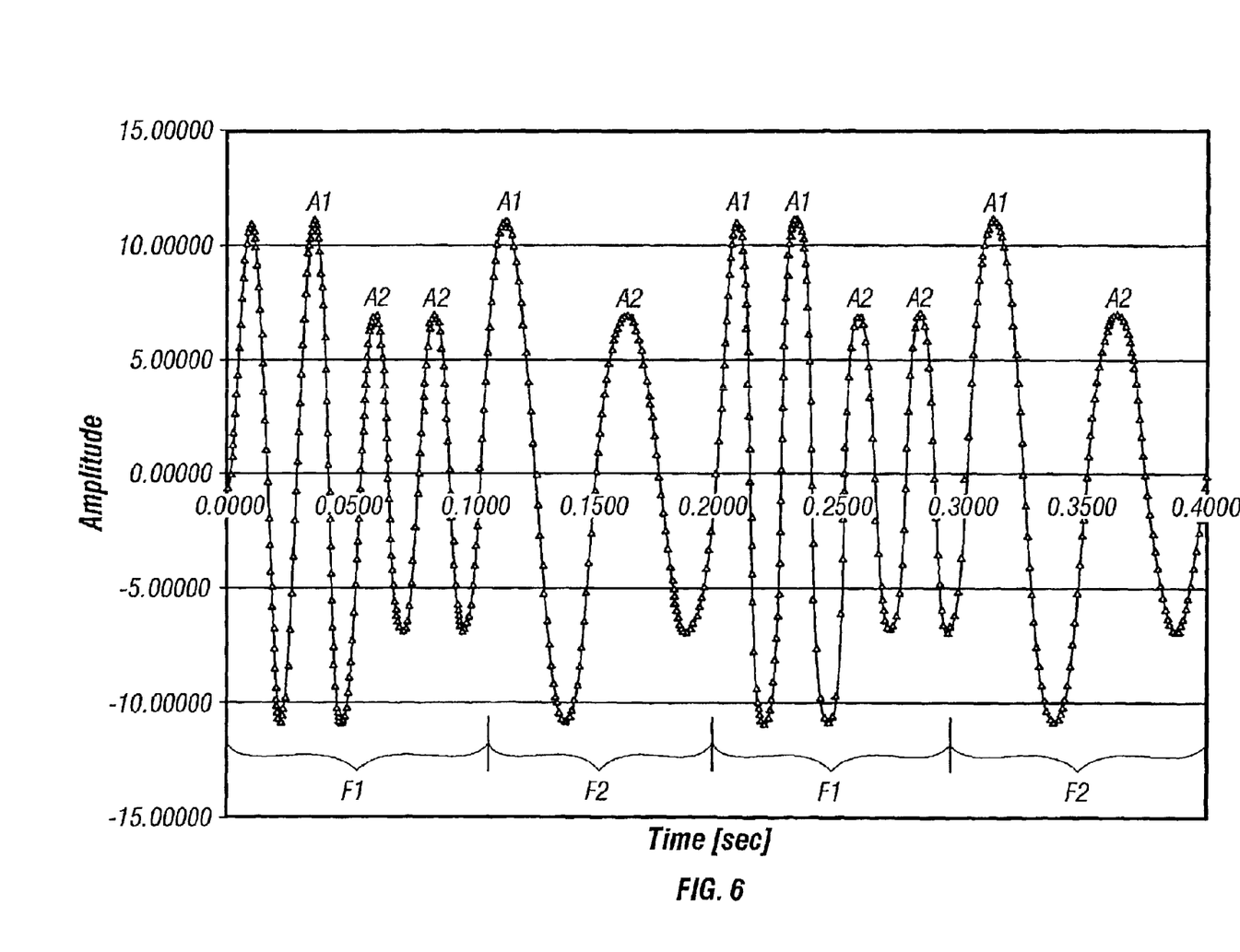
FIG. 6 is a schematic which describes a combination of Frequency Shift Key and Amplitude Shift Key encoding using a reciprocating valve according to one embodiment of the present invention.

In addition, because the poppet 103 can be continuously and accurately controlled, combinations of ASK and FSK or ASK and PSK may be used to encode and transmit multiple signals at the same time, greatly increasing the effective data rate. FIG. 6 is a schematic showing one scheme for combining an ASK and an FSK encoded signal. Both signals are carried out in a constant phase relationship with an amplitude shift from A1 to A2 or from A2 to A1 representing data bits of a first encoded signal and the frequency shifts from F1 to F2 or from F2 to F1 representing data bits of a second encoded signal. This type of signal is generated by changing both the reciprocating frequency of the poppet 103 and simultaneously changing the poppet 103 travel, as previously described. Similarly, a signal combining ASK and PSK encoding (not shown) can be generated by changing the phase relationship of a constant frequency signal while simultaneously changing the amplitude by changing the poppet 103 travel. Here, the amplitude shifts represent a first encoded signal and the phase shifts represent a second encoded signal.

The foregoing description is directed to particular embodiments of the present invention for the purpose of illustration and explanation. It will be apparent, however, to one skilled in the art that many modifications and changes to the embodiment set forth above are possible without departing from the scope and the spirit of the invention. It is intended that the following claims be interpreted to embrace all such modifications and changes.

What is claimed is:

1. A reciprocating pulser system for generating pressure fluctuations in a flowing drilling fluid, comprising:
    a tool housing adapted to support a pulser assembly;
    the pulser assembly, comprising;
        a nozzle assembly disposed in the drilling fluid flow, said nozzle assembly having a main nozzle and at least one bypass nozzle for channeling the drilling fluid flow through the nozzle assembly;
        a linear actuator assembly for driving a poppet in a first direction toward the main nozzle, and then in a reverse second direction away from the main nozzle, the poppet movement generating pressure fluctuations in the drilling fluid; and,
        an electronics module for controlling the pulser system.

2. The reciprocating pulser system of claim 1, wherein the tool housing is further adapted to house at least one upper pressure sensor proximate an upper housing end and at least one lower pressure sensor proximate a lower housing end.

3. The reciprocating pulser system of claim 1, wherein the linear actuator assembly comprises;
    a lubricant filled actuator housing;
    a linear drive electric motor disposed in the lubricant filled housing, said drive motor adapted to drive the poppet in said first direction and said reverse second direction;
    a shaft with a first end adapted to attach to the drive motor, and a second end adapted to attach to the poppet;
    a force balance spring disposed between the drive motor and an actuator housing end cap, said spring designed to balance a drilling fluid force acting on the poppet;
    a seal for sealing between the housing end cap and the shaft, thereby preventing the intrusion of the drilling fluid into the lubricant filled housing.

4. The reciprocating pulser system of claim 3, wherein, the fluid seal for environmentally sealing between the housing and the shaft is a flexible elastomeric bellows.

5. The reciprocating pulser system of claim 1 wherein the electronics module comprises circuitry to power and control the motion of the motor, and circuitry to power and read the pressure sensors.

6. The reciprocating pulser system of claim 5 wherein the circuitry to control the motor comprises a programmable processor adapted to perform programmed instructions for controlling the motion of the motor.

7. The reciprocating pulser system of claim 6 wherein the programmable processor is adapted to read pressure signals from the at least one upper pressure sensor and the at least one lower pressure sensor, said processor modifying the motor motion, according to programmed instructions, to maintain a predetermined differential pressure between the at least one upper pressure sensor and the at least one lower pressure sensor.

8. The reciprocating pulser system of claim 5 wherein the programmable processor is adapted, according to programmed instructions, to detect and decode a command pressure pulse signal sent from a surface location, said processor thereby modifying the motion of the motor, according to programmed instructions.

9. A method for generating a fast transition in a phase shift key encoding (PSK) scheme for mud pulse telemetry, comprising;
    utilizing a linear electric motor for driving a reciprocating poppet in a first direction and then in a reverse second direction to generate pressure pulses in a drilling fluid;
    driving the poppet with a first predetermined signal phase relationship;
    changing the drive signal according to the PSK scheme at a predetermined poppet position; and
    attaining a second predetermined phase relationship in no more than one poppet oscillatory period.

10. A method for generating a fast transition in a frequency shift key encoding (FSK) scheme for mud pulse telemetry, comprising;
    utilizing a linear electric motor for driving a reciprocating poppet in a first direction and then in a reverse second direction to generate pressure pulses in a drilling fluid;
    driving the poppet at a first frequency;
    changing the drive signal according to the FSK scheme at a predetermined poppet position; and
    attaining a second predetermined frequency in no more than one poppet oscillatory period.

11. A method for generating a fast transition in an amplitude shift key encoding (ASK) scheme for mud pulse telemetry, comprising;
    utilizing a linear electric motor for driving a reciprocating poppet in a first direction and then in a reverse second direction to generate pressure pulses in a drilling fluid;
    driving the poppet a first predetermined travel distance;
    changing the drive signal according to the ASK scheme at a predetermined poppet position; and
    attaining a second predetermined travel distance in no more than one poppet oscillatory period.

12. A method for generating an increased data rate in a mud pulse telemetry scheme by combining an amplitude shift key encoding (ASK) scheme and a frequency shift key encoding scheme (FSK), comprising;
    utilizing a linear electric motor for driving a reciprocating poppet in a first direction and then in a reverse second direction to generate pressure pulses in a drilling fluid;
    driving the poppet in a reciprocating motion through a first travel distance at a first frequency, thereby generating a first pulse amplitude at a first frequency;
    changing the drive signal according to the ASK and FSK schemes at a predetermined poppet position; and
    driving the poppet in a reciprocating motion through a second travel distance at a second frequency, thereby attaining a second pulse amplitude at a second frequency in no more than one poppet oscillatory period.

13. A method for generating an increased data rate in a mud pulse telemetry scheme by combining an amplitude shift key encoding (ASK) scheme and a phase shift key encoding scheme (PSK), comprising;
    utilizing a linear electric motor for driving a reciprocating poppet in a first direction and then in a reverse second direction to generate pressure pulses in a drilling fluid;
    driving the poppet in a reciprocating motion through a first travel distance at a fixed frequency at a first phase angle, thereby generating a first pulse amplitude at a first phase angle;
    changing the drive signal according to the ASK and PSK schemes at a predetermined poppet position; and
    driving the poppet in a reciprocating motion through a second travel distance at the fixed frequency at a second phase angle, thereby attaining a second pulse amplitude at a second phase angle in no more than one poppet oscillatory period.

* * * * *